(12) United States Patent
Dancy et al.

(10) Patent No.: US 9,218,192 B2
(45) Date of Patent: Dec. 22, 2015

(54) INFORMATION HANDLING DEVICE LOCALLY REPRODUCING RECEIVED DEFECTS BY SELECTING AN APPROPRIATE VIRTUAL MACHINE IMAGE

(71) Applicant: INTERNATIONAL BUSINESS MACHINES CORPORATION, Armonk, NY (US)

(72) Inventors: Jerry A Dancy, Raleigh, NC (US); Pralhad M Khatri, Durham, NC (US); Geoffrey D Lubold, Wake Forest, NC (US); Christopher A Maul, Wake Forest, NC (US); Brad B Topol, Cary, NC (US); Sahdev Zala, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 110 days.

(21) Appl. No.: 13/740,236

(22) Filed: Jan. 13, 2013

(65) Prior Publication Data

US 2014/0201572 A1    Jul. 17, 2014

(51) Int. Cl.
*G06F 9/44* (2006.01)
*G06F 9/455* (2006.01)
(Continued)

(52) U.S. Cl.
CPC ............ *G06F 9/45533* (2013.01); *G06F 9/445* (2013.01); *G06F 9/45558* (2013.01);
(Continued)

(58) Field of Classification Search
CPC .. G06F 9/4401; G06F 11/3636; G06F 11/366
See application file for complete search history.

(56) References Cited

U.S. PATENT DOCUMENTS 6,167,358 A * 12/2000 Othmer et al. ................ 702/188
6,266,788 B1 * 7/2001 Othmer et al. ............. 714/38.11
(Continued)

FOREIGN PATENT DOCUMENTS

WO    2012065815 A1    5/2012

OTHER PUBLICATIONS

Beloglazov—"Optimal Online Deterministic Algorithms and Adaptive Heuristics for Energy and Performance Efficient Dynamic Consolidation of Virtual Machines in Cloud Data Centers", Published online in Wiley InterScience (www.interscience.wiley.com). DOI: 10.1002/cpe.1867 http://beloglazov.info/papers/2012-optimal-algorithms-ccpe.pdf, Concurrency and Computation: Practice and Experience 2012; 24:1397-1420, pp. 1-22 (2012).
(Continued)

*Primary Examiner* — Thomas Lee
*Assistant Examiner* — Santosh R Poudel
(74) *Attorney, Agent, or Firm* — John Pivnichny; Mark P Kahler

(57) ABSTRACT

A method for selecting a virtual machine (VM) for problem determination utilizes a policy-based process for receiving an authorized program analysis report (APAR) containing problem type, a client information handling system (IHS) environment, a configuration, and a program version. The method determines automatically that the problem according to a provisioning policy is a candidate for provisioning a VM for analyzing the problem and searches a provisioning database for an existing VM for a system environment and configuration according to a closeness criteria. The method applies required updates to the provisioned VM, and utilizes the provisioned VM with the required updates for problem analysis. The method also may automatically create a new baseline image in the database according to expected value policy criteria that exceeds predetermined criteria.

10 Claims, 5 Drawing Sheets

(51) Int. Cl.
*G06F 11/07* (2006.01)
*G06F 9/445* (2006.01)
*G06F 17/30* (2006.01)

(52) U.S. Cl.
CPC ........ G06F11/079 (2013.01); G06F 17/30106 (2013.01); G06F 17/30244 (2013.01); *G06F 11/0712* (2013.01)

(56) References Cited

U.S. PATENT DOCUMENTS

| | | | |
|---|---|---|---|
| 7,823,138 B2* | 10/2010 | Arguelles et al. | 717/131 |
| 8,683,548 B1* | 3/2014 | Curry et al. | 726/1 |
| 8,782,472 B2* | 7/2014 | Ganesan et al. | 714/48 |
| 8,972,788 B2* | 3/2015 | Gschwind et al. | 714/37 |
| 2006/0156077 A1* | 7/2006 | Altaf et al. | 714/57 |
| 2009/0282404 A1 | 11/2009 | Khandekar | |
| 2010/0223610 A1 | 9/2010 | Dehaan | |
| 2011/0161491 A1* | 6/2011 | Sekiguchi | 709/224 |
| 2012/0131577 A1* | 5/2012 | Arcese et al. | 718/1 |
| 2013/0042153 A1* | 2/2013 | McNeeney | 714/38.1 |
| 2013/0326510 A1* | 12/2013 | Adekile et al. | 718/1 |

OTHER PUBLICATIONS

Bonde—"Adaptive Provisioning of Virtual Machines", Submitted in Partial Fulfillment of the requirements for the degree of Master of Technology, Roll No: 08305910, Department of Computer Science and Engineering, Indian Institute of Technology, Bombay, pp. 1-29, (2011).

Calheiros1—"Virtual Machine Provisioning Based on Analytical Performance and QoS in Cloud Computing Environments", International Conference on Parallel Processing, Taipai, Taiwan, pp. 1-35, (Sep. 13, 2012).

Calheiros2—"Virtual Machine Provisioning Based on Analytical Performance and QoS in Cloud Computing Environments", 2011 International Conference on Parallel Processing, Taipai, Taiwan, pp. 295-304 (2011).

Crump—"Dealing With Virtual Machine Provisioning", downloaded from http://www.storage-switzerland.com/Articles/Entries/2010/5/7_Dealing_with_Virtual_Machine_Provisioning.html (dated May 7, 2010).

Duffy—"Virtual Machine Storage Provisioning and Best Practises", downloaded from http://www.simple-talk.com/sysadmin/virtualization/virtual-machine-storage-provisioning-and-best-practises/, pp. 1-11, (May 14, 2010).

IBM—"APAR Explained", pp. 1-5, downloaded from http://www-01.ibm.com/support/docview.wss?uid=swg21424131, (dated Aug. 19, 2010).

Kansal—"Virtual Machine Power Metering and Provisioning", SoCC'10, pp. 1-12, (Jun. 10-11, 2010).

Marcese—"Cloud/Virtualization Management, Rapid Deployments with IBM Smart Cloud Provisioning", p. 1, screen shot taken of https://www.ibm.com/developerworks/downloads/tiv/smartcloud/index.html on Dec. 15, 2012.

Meng—"Efficient Resource Provisioning in Compute Clouds via VM Multiplexing", ICAC'10, Jun. 7-11, 2010, pp. 1-10, (Jun. 7, 2010).

Peng—"VDN: Virtual Machine Image Distribution Network for Cloud Data Centers", C. Peng, M. Kim, Z. Zhang, and H. Lei IEEE International Conference on Computer Communications (INFOCOM 2012), Orlando, FL, USA, pp. 1-9, (Mar. 2012).

Pitts—"Virtual Machine Provisioning", pp. 1-14 downloaded from http://blogs.technet.com/b/opalis/archive/2010/05/05/virtual-machine-provisioning.aspx on Oct. 22, 2012.

Shivam—"Automated and On-Demand Provisioning of Virtual Machines for Database Applications", pp. 1-3, SIGMOD'07, Jun. 11-14, 2007, Beijing, China (Jun. 11, 2007).

Tan—"Heavy-traffic Analysis of Cloud Provisioning", Teletraffic Congress (ITC 24), 2012 24th International Author(s): Jian Tan; Hanhua Feng ; Xiaoqiao Meng ; Li Zhang pp. 1-8 (Date of Conference: Sep. 4-7, 2012).

VMWARE—"How to Provision Virtual Machines", p. 1 downloaded from http://pubs.vmware.com/vsphere-4-esx-vcenter/topic/com.vmware.vsphe_provision_virtual_machines/c_how_to_provision_virtual_machines.html on Oct. 22, 2012.

Wiki—"Dynamic Provisioning Environment", pp. 1-2, downloaded from http://en.wikipedia.org/wiki/Dynamic_Provisioning_Environment on Oct. 18, 2012.

* cited by examiner

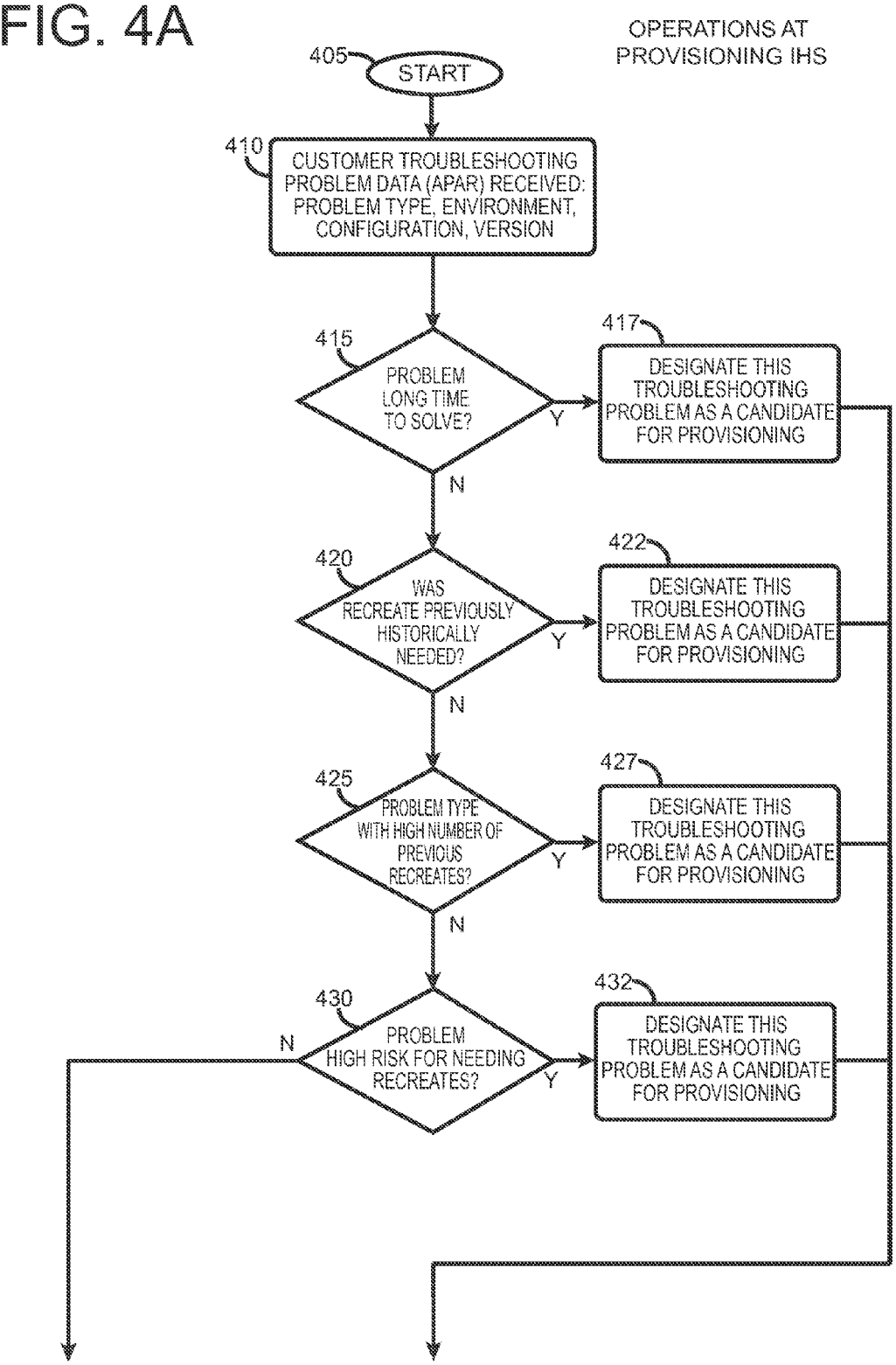

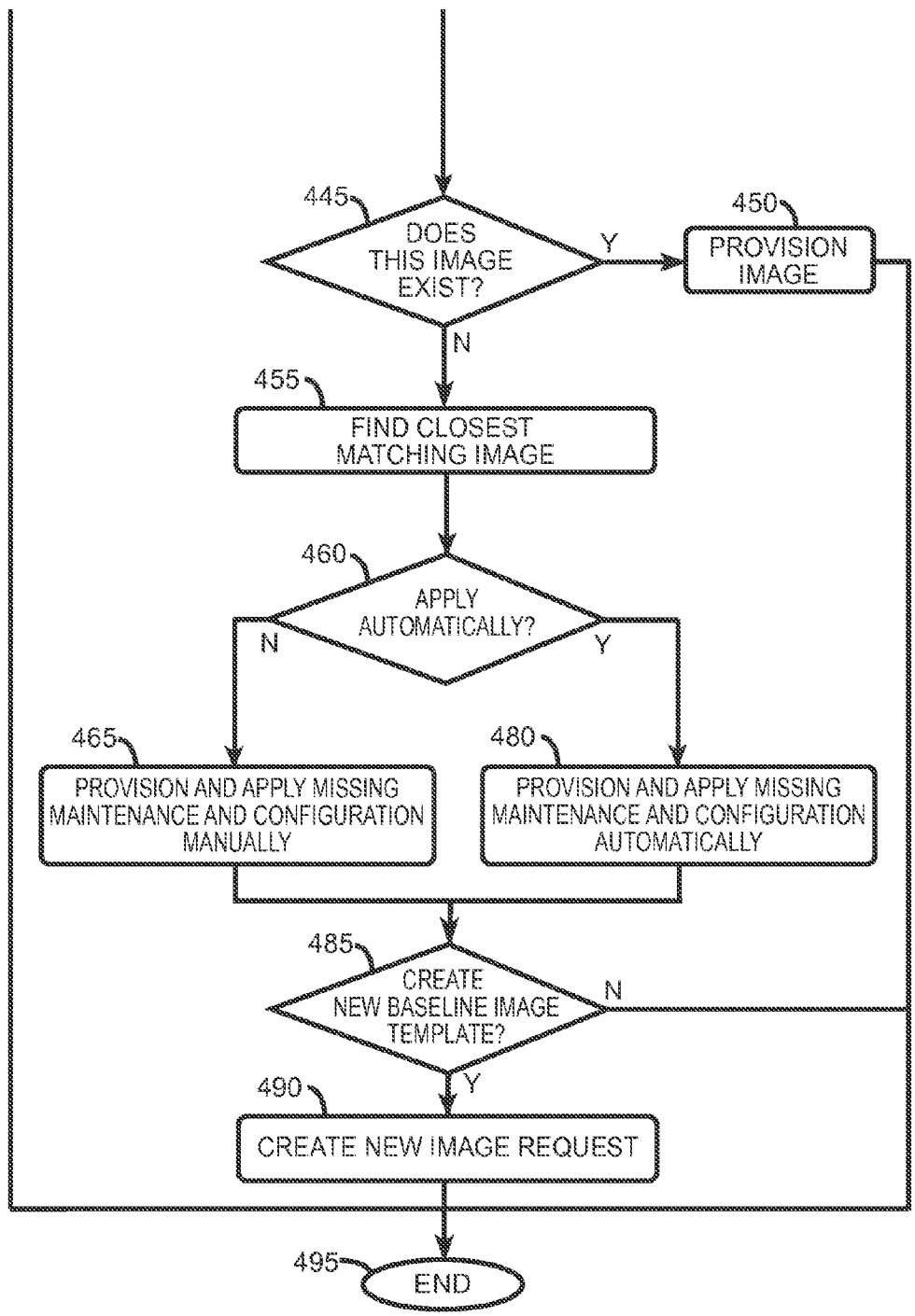

INFORMATION HANDLING DEVICE LOCALLY REPRODUCING RECEIVED DEFECTS BY SELECTING AN APPROPRIATE VIRTUAL MACHINE IMAGE

BACKGROUND

The disclosures herein relate generally to information handling systems (IHSs), and more particularly, to provisioning virtual machines (VMs) in IHSs.

In complex network environments, customers may acquire many real, physical server IHSs to provide the computing capabilities that they desire. Multiple virtual servers may together form a virtual data center with greater flexibility than real physical servers can provide.

BRIEF SUMMARY

In one embodiment, a method is disclosed for provisioning a virtual machine image for troubleshooting purposes. The method includes receiving, by a file system tool in a provisioning IHS, a problem report that describes a problem in a client IHS. The method also includes determining without manual intervention, by the file system tool in the provisioning IHS, if the problem is a candidate for provisioning locally in the provisioning IHS for the purpose of troubleshooting the problem in the client IHS. The method further includes accessing, by the file system tool in the provisioning IHS, a virtual machine image database that includes a plurality of virtual machine images to determine if a particular virtual machine image therein is a match for the problem in the problem report of the client IHS and in the event of such a match provisioning the particular virtual machine image to a memory of the provisioning IHS after application of maintenance information and configuration information to the particular virtual machine image. The method still further includes testing the particular virtual machine image provisioned in the provisioning IHS to troubleshoot the problem in the client IHS.

In another embodiment, a provisioning information handling system (IHS) is disclosed that includes a processor. The provisioning IHS also includes a memory that is coupled to the processor. The memory includes a file system tool that is configured to receive a problem report that describes a problem in a client IHS. The memory is also configured to determine without manual intervention if the problem is a candidate for provisioning locally in the provisioning IHS for the purpose of troubleshooting the problem in the client IHS. The memory is further configured to access a virtual machine image database that includes a plurality of virtual machine images to determine if a particular virtual machine image therein is a match for the problem in the problem report of the client IHS and in the event of such a match provisioning the particular virtual machine image to a memory of the provisioning IHS after application of maintenance information and configuration information to the particular virtual machine image. The memory is still further configured to test the particular virtual machine image provisioned in the provisioning IHS to troubleshoot the problem in the client IHS.

In another embodiment, a computer program product is disclosed that includes a non-transitory computer readable storage medium for use in a provisioning information handling system (IHS). The storage medium stores first instructions that receive a problem report that describes a problem in a client IHS. The storage medium also stores second instructions that determine without manual intervention if the problem is a candidate for provisioning locally in the provisioning IHS for the purpose of troubleshooting the problem in the client IHS. The storage medium further stores third instructions that access a virtual machine image database that includes a plurality of virtual machine images to determine if a particular virtual machine image therein is a match for the problem in the problem report of the client IHS and in the event of such a match provisioning the particular virtual machine image to a memory of the provisioning IHS after application of maintenance information and configuration information to the particular virtual machine image. The storage medium also stores fourth instructions that test the particular virtual machine image provisioned in the provisioning IHS to troubleshoot the problem in the client IHS.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 4A is a first portion of a flowchart that depicts the operation of one embodiment of the disclosed provisioning IHS in the VM system.

FIG. 4B is a second portion of a flowchart that depicts the operation of one embodiment of the disclosed provisioning IHS in the VM system.

DETAILED DESCRIPTION

Figure 1:
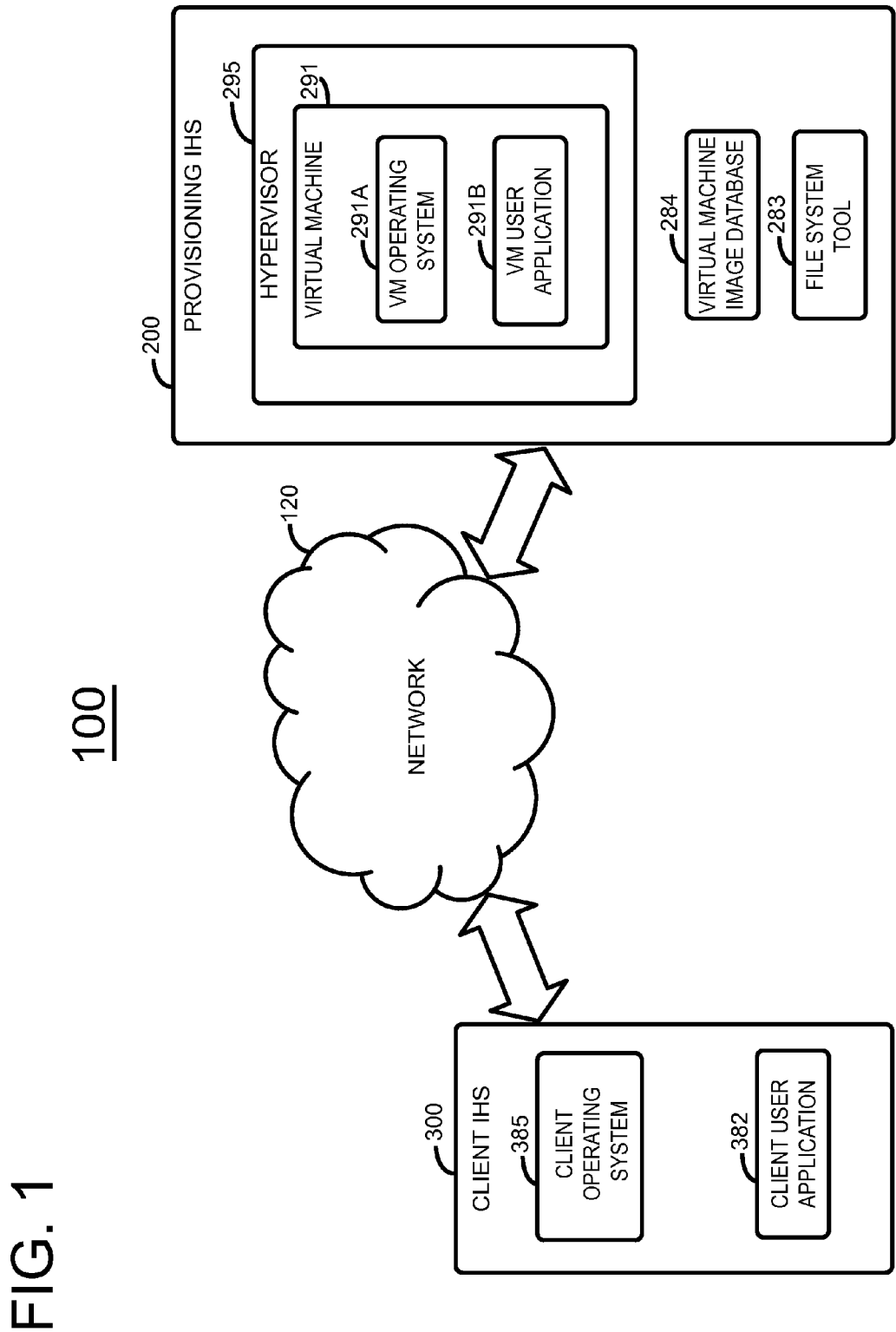
FIG. 1 is a block diagram of one embodiment of the disclosed VM system.

A virtual machine system includes a client information handling system (IHS) that a network connects to a provisioning information handling system (IHS). A customer at the client IHS may send a problem report to the provisioning IHS. The problem report may include information concerning the client IHS including client IHS environment information, client IHS configuration information, client IHS operating system (OS) version information and client IHS application version information. The client IHS environment information may include information that identifies the client IHS operating system (OS), the OS version and installed client application names and versions.

The provisioning IHS may employ automated data collection to receive an authorized program analysis report (APAR) that describes a program problem or program problems in the client IHS. When the APAR arrives at the provisioning IHS, a file system tool in the provisioning IHS applies proactive provisioning policies to determine candidacy of the problem in the APAR for automatically provisioning a virtual environment for problem recreation at the provisioning IHS. If the file system tool in the provisioning IHS determines that the problem in the APAR is a candidate for provisioning, the file system tool accesses a virtual machine image database and either finds or creates the appropriate virtual machine image. In that event, the file system tool applies necessary maintenance to the virtual machine image automatically, and/or with manual assistance to properly configure that virtual machine image as a virtual machine in a hypervisor of the provisioning IHS. This virtual machine is useful for analysis and troubleshooting of the customer problem that the received APAR provides. In one embodiment, maintenance refers to applying maintenance information to modify a virtual machine image for maintenance purposes. In one embodiment, configuring a virtual machine image refers to applying configuration information to a virtual machine image.

The file system tool in the provisioning IHS may apply predetermined policies to determine whether to create a new baseline virtual image template that the file system tool may save in the database memory of the provisioning IHS for future use.

A policy-based selection process for provisioning the most appropriate virtual environment may include the following steps. These steps may employ current problem determination information and historical problem type analysis:

(A) From the client IHS, the customer sends to the provisioning IHS an APAR including problem type information, environment information, and product configuration information and version information with respect to the client IHS.

(B) Different APARs may represent different problem scenarios. The provisioning IHS determines if a particular problem scenario in a received APAR is a candidate for provisioning by considering several factors. These factors may include problem type, typical time duration required to solve this problem type, historical problem data, and problem characteristics that determine if the problem scenario typically requires a recreate of a customer APAR. A recreate represents another instance of provisioning of a virtual machine image for a problem previously encountered, but not previously stored in the virtual machine image database. In one embodiment, when the provisioning IHS previously encountered the problem in the APAR, the provisioning IHS may have created a provisioned virtual machine image, but under relevant provisioning policies did not previously store the virtual machine image in the database. If at some point in the future, the provisioning IHS encounters another instance of the same problem in a received APAR, then the same virtual machine image needs to be recreated, i.e. a "recreate".

(C) If the file system tool in the provisioning IHS determines that this problem scenario is a candidate for provisioning, then the file system tool searches the database memory in the provisioning IHS for a preexisting stored virtual machine image that matches the environment information, configuration information, operating system version information and application version information in the APAR from the client IHS.

(D) If the file system tool finds a preexisting stored image that matches the environment information, configuration information, and operating system version information and application version information in the APAR, then the file system tool provisions this virtual machine image from the database to the hypervisor in the system memory of the provisioning IHS.

(E) Otherwise, the file system tool may search for a closest matching virtual machine image in the database and determine whether the file system tool may automatically apply missing maintenance and perform necessary configuration on this virtual machine image, and if possible, provision this virtual machine image by automatically applying missing maintenance and configuration.

(F) If the file system tool cannot automatically apply missing maintenance and configuration to the virtual machine image, then the file system tool provisions the closest matching image and may allow for a system operator to manually apply maintenance and configuration to the virtual machine image.

(G) The file system tool then may apply proactive provisioning policies to determine whether to create a new baseline image template of the newly automatically provisioned or manually provisioned image, taking into account the policy factors shown in TABLE 1 below.

TABLE 1

| POLICY FACTORS | POLICY |
|---|---|
| 1 | Is the time required to install maintenance on the provisioned virtual machine image greater than a predetermined amount of time? |
| 2 | Are the number of maintenance fixes greater than a predetermined threshold? |
| 3 | Is the complexity/time to complete a maintenance fix installation on the provisioned virtual machine image greater than a predetermined threshold? |
| 4 | Is the number of prerequisites greater than a predetermined threshold? The term "prerequisites" refers to software components that must be installed and present before the software that has the APAR can successfully be installed.) |
| 5 | Does applying a configuration to create an appropriate customer image take longer than a predetermined threshold of time? |

Proactive policies for provisioning virtual machine environments may allow for efficient image provisioning without dramatically over-provisioning resources. This approach may reduce the amount of time and overhead for the provisioning IHS to set up an appropriate virtual environment for problem recreation troubleshooting sessions. The method may also optimize the process for determining when it is appropriate to create new virtual image template that further reduces the overhead of leveraging virtual images for troubleshooting.

FIG. 1 is a block diagram of a virtual machine (VM) system 100. VM system 100 includes a provisioning IHS 200 that includes hypervisor 295. VM system 100 also includes a client IHS 300 that communicates with provisioning IHS 200 via a network 120. Provisioning IHS 200 includes a virtual machine image database 284 that may include multiple virtual machine images that provisioning IHS 200 may have previously provisioned. File system tool 283 uses policy criteria from the policies of TABLE 1 to select a particular virtual machine image from virtual machine image database 284. For example, file system tool 283 may select a virtual machine image from image database 284 that matches the problem in the APAR that provisioning IHS 200 receives from a client IHS 300. Alternatively, if there is not such a match in the database 284, then file system tool 283 may select a particular virtual machine image in database 284 that most closely matches the problem in the APAR. File system tool 283 may load the selected virtual machine image into system memory (not shown) in provisioning IHS 200 and employ the selected virtual machine as an appropriate testing environment for the problem that the APAR specifies. In this manner, the selected virtual machine image in the provisioning IHS 200 is useful for troubleshooting the problem that provisioning IHS 200 receives from client IHS 300 via the APAR.

In more detail, upon selection of an appropriate virtual machine image 291 from virtual machine image database 284, provisioning IHS 200 loads the selected virtual machine image 291 into hypervisor 295. As shown in FIG. 1, the virtual machine image 291 includes VM operating system 291A and VM user application 291B therein. Hypervisor 295 controls guest virtual machines such as VM 291. The virtual machine (VM) 291 represents virtually the environment in a client IHS 300 (not shown in this view) that includes a client operating system 385 and a client user application 382. This arrangement facilitates troubleshooting and problem solving by provisioning IHS 200 with a problem that client IHS 300 is experiencing.

Figure 2:
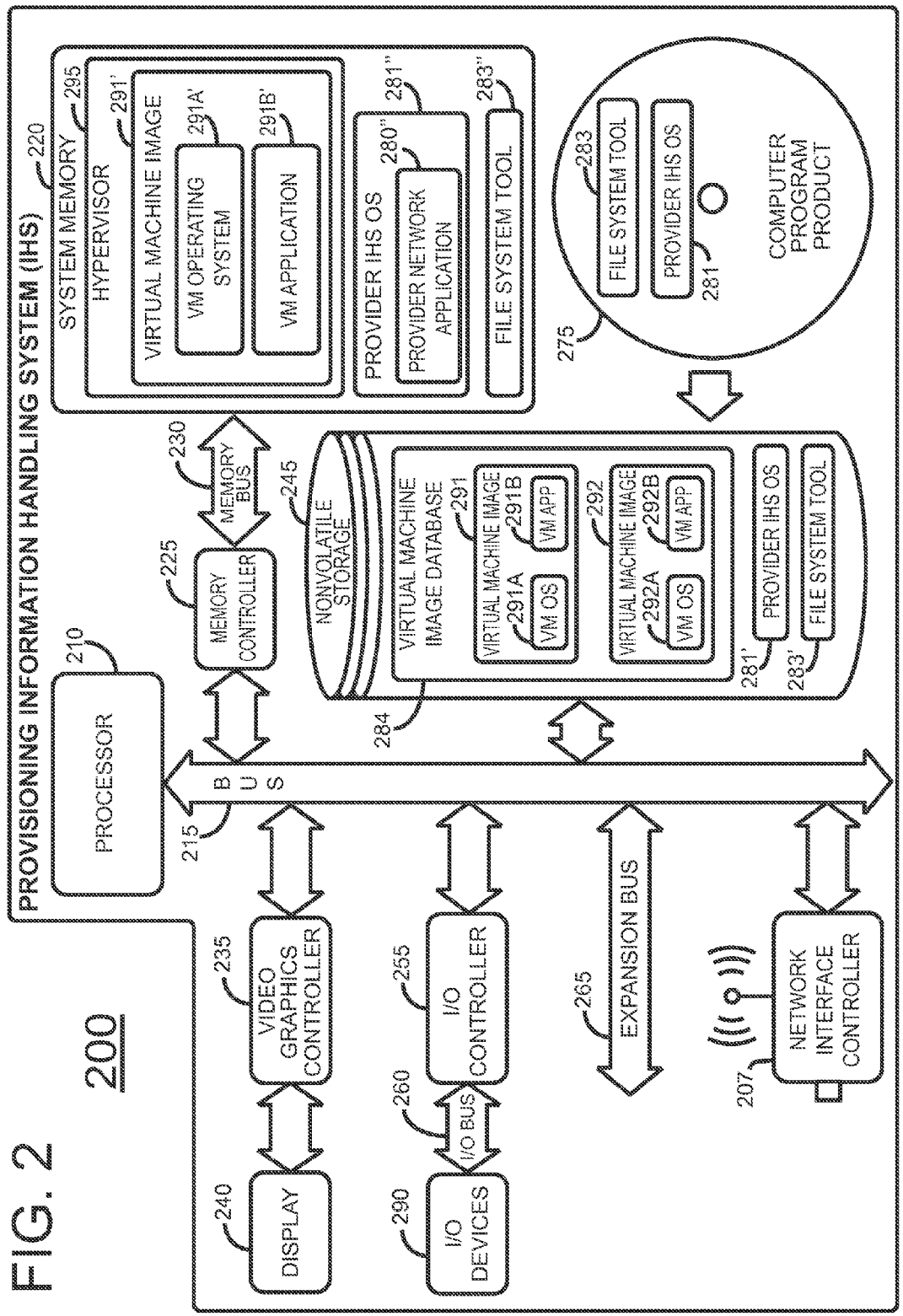
FIG. 2 is a block diagram of one embodiment of a provisioning IHS.

FIG. 2 is a block diagram of a provisioning information handling system (IHS) 200 that the virtual machine system 100 may employ as the provisioning IHS 200 for controlling a virtual machine. The provisioning IHS 200 includes a processor 210 that may include multiple cores. The provisioning IHS 200 processes, transfers, communicates, modifies, stores or otherwise handles information in digital form, analog form or other form. Provisioning IHS 200 includes a bus 215 that couples processor 210 to system memory 220 via a memory controller 225 and memory bus 230. In one embodiment, system memory 220 is external to processor 210. System memory 220 may be a static random access memory (SRAM) array and/or a dynamic random access memory (DRAM) array. A video graphics controller 235 couples display 240 to bus 215. Nonvolatile storage 245, such as a hard disk drive, CD drive, DVD drive, or other nonvolatile storage couples to bus 215 to provide provisioning IHS 200 with non-transitory permanent storage of information. I/O devices 290, such as a keyboard and a mouse pointing device, couple to bus 215 via I/O controller 255 and I/O bus 260. One or more expansion busses 265, such as USB, IEEE 1394 bus, ATA, SATA, PCI, PCIE, DVI, HDMI and other expansion busses, couple to bus 215 to facilitate the connection of peripherals and devices to provisioning IHS 200.

Provisioning IHS 200 includes a network interface controller 207 that couples to bus 215 to enable provisioning IHS 200 to connect by wire or wirelessly to a network such as network 120. Provisioning IHS 200 may take the form of a desktop, floor-standing, rack-mounted, portable, laptop, notebook, tablet, or other form factor computer or data processing system. Provisioning IHS 200 may take other form factors such as a gaming device, a personal digital assistant (PDA), a portable telephone device, a communication device or other devices that include a processor and memory.

Provisioning IHS 200 may include a computer program product on digital media 275 such as a CD, DVD or other media. In one embodiment, digital media 275 includes a file system tool 283 and a provisioning IHS operating system (OS) 281 for loading as file system tool 283' and provisioning IHS OS 281', respectively, on nonvolatile storage 245. Nonvolatile storage 245 may store a virtual machine image database 284 that includes multiple virtual machine images that provisioning IHS 200 may have previously provisioned. For example, virtual machine image database 284 may include virtual machine (VM) 291 which may contain VM OS 291A and VM application (app) 291B. Virtual machine image database 284 may also store virtual machine (VM) 292 which may contain VM OS 292A and VM application (app) 292B. Virtual machine image database 284 may include other previously provisioned virtual images as well.

When provisioning IHS 200 initializes, provisioning IHS 200 loads provisioning IHS OS 281' and file system tool 283' into hypervisor 295 of system memory 220 for execution as provisioning IHS OS 281" and file system tool 283", respectively. Provisioning IHS OS 281", which may include provisioning network application 280", governs the operation of provisioning IHS 200. In an alternative embodiment, provisioning network application 280" may be an application that is separate and distinct from provisioning IHS OS 281". Network application 280" facilitates communications with client IHS 300 via network 120. Upon receiving an APAR from client IHS 300, file system tool 283" of provisioning IHS 200 may select an appropriate virtual machine image from virtual machine image database 284 by considering the policies of TABLE 1 to perform the selection. For example, file system tool 283" may select virtual machine image 291 from virtual machine image database 284. Upon selection of virtual machine image 291, file system tool 283" may store virtual machine image 291 as virtual machine image 291' in hypervisor 295 of system memory 220. In that scenario, virtual machine image 291' in system memory 220 includes VM operating system 291A' and VM application 291B', as shown in FIG. 2.

Figure 3:
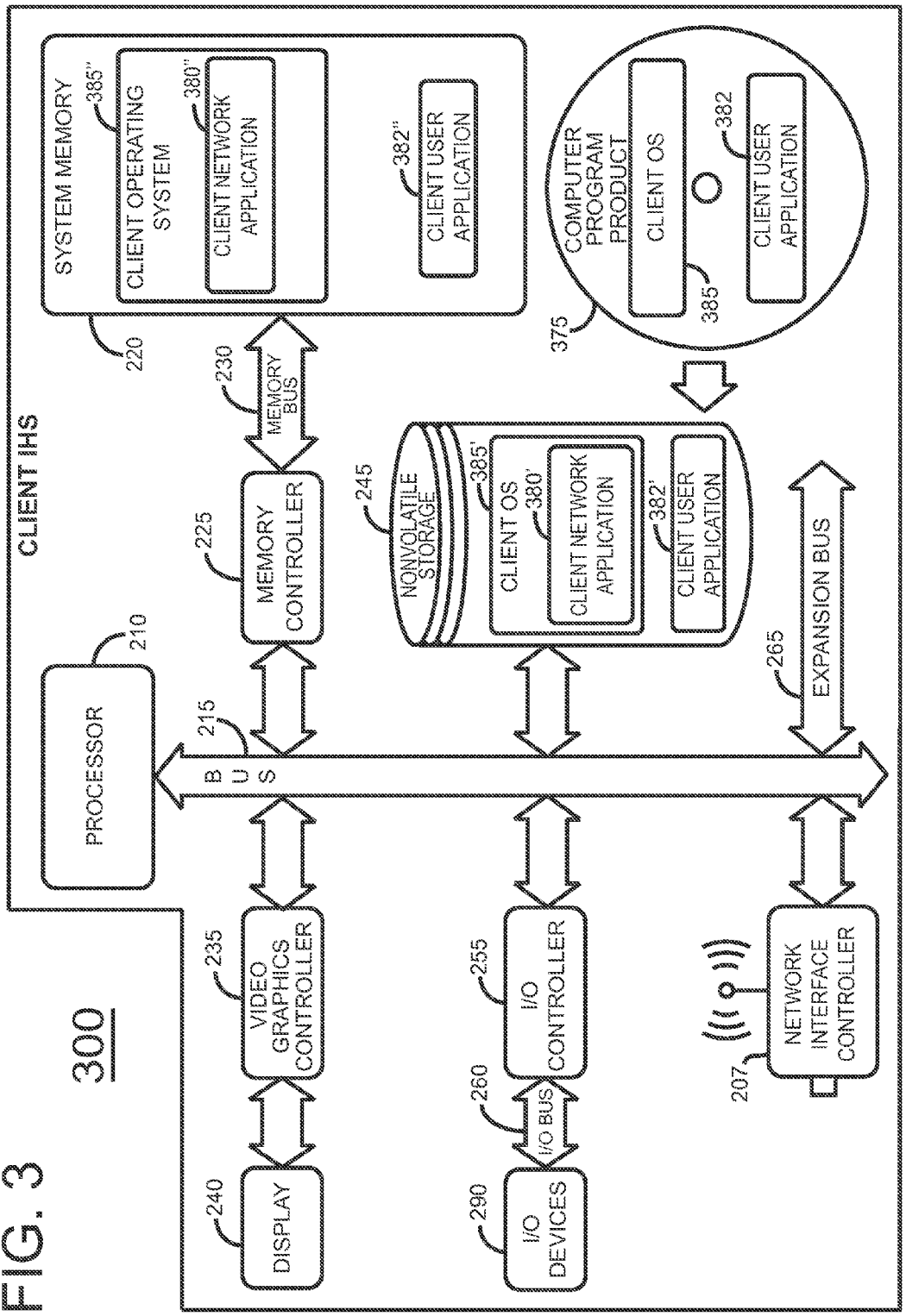
FIG. 3 is a block diagram of one embodiment of a client IHS.

FIG. 3 is a block diagram of the client information handling system (IHS) 300 that may connect via network 120 with provisioning IHS 200. Client IHS 300 of FIG. 3 includes many elements in common with provisioning IHS 200 of FIG. 2. Like numbers indicate like elements when comparing client IHS 300 of FIG. 3 with provisioning IHS 200 of FIG. 2. However, whereas client IHS 300 of FIG. 3 includes client OS 385", client network application 380" and client user application 382" in system memory, the above-described provisioning IHS 200 of FIG. 2 includes hypervisor 295 in system memory 220 which may host a virtual machine emulating the operating environment of client IHS 300.

Client IHS 300 may include a computer program product on digital media 375 such as a CD, DVD or other media. In one embodiment, digital media 375 includes a client user application 382 and a client operating system (OS) 385 for loading as client user application 382' and a client OS 385' on nonvolatile storage 245. Client OS 385' may include client network application 380' for communication via network interface controller 207 over network 120.

When client IHS 300 initializes, client IHS 300 loads client operating system 385' (including client network application 380') and client user application 382' into system memory 220 for execution as client operating system 385", and client user application 382". Client operating system 385", which may include client network application 380", governs the operation of client IHS 300. In an alternative embodiment, client network application 380" may be an application that is separate and distinct from client operating system 385".

The flowchart of FIG. 4A and FIG. 4B shows a representative process flow of operations at provisioning IHS 200 with respect to hosting a virtual machine representation of the environment of client IHS 300 for problem analysis and trouble-shooting purposes. Operation commences with start block 405 in FIG. 4A and continues to operations of FIG. 4B. It will be appreciated that while the process may terminate with end block 495, the process may begin again with operation commencing at start block 405.

In one embodiment, the process for proactively provisioning a virtual machine image commences with start block 405. Provisioning IHS 200 receives an authorized program analysis report (APAR) from client IHS 300, as per block 410. The APAR may include customer troubleshooting information such as problem type, environment, configuration and version of client OS and/or client applications. File system tool 283" sequentially applies several tests to the APAR. The file system tools 283" determine whether the problem may take a long time to solve, as per decision block 415. A long time to solve problem refers to a problem whose time to resolution is significantly greater than the average time to resolution for problem sent to provisioning IHS 200 via an APAR for resolution. If the problem does not take more than a predetermined long amount of time to solve, then file system tool 283" determines whether a recreation (i.e. a recreate) of the same problem has been historically needed, as per decision block 420. If a recreate of the same problem has not been historically needed, then file system tool 283" determines whether the problem type had a high number of previous recreates, as per decision block 425. Examples of problem types include out-of-memory issues, software crash issues, performance issues, software installation issues, software upgrade issues, and software configuration issues. If the problem type did not result in a high number of previous recreates, then file system tool 283" determines whether a high risk exists for needing recreates of this problem type, as per decision block 430. Examples of problems that exhibit high risk for needing a recreate include those problems indicated by anecdotal information from experienced support engineers as frequently needing a recreate. Moreover, orthogonal problem classification (OPC) analysis may provide OPC data that indicates those problems that are at high risk for needing recreates. OPC schema may contain a question that asks if a problem required a recreate. If a high risk does not exist for needing recreates of this problem type, operation terminates with end block 495.

If any results of the tests applied by the file system tool 283" of the problem data result in a yes (Y) at decision blocks 415, 420, 425 and 430, then provisioning IHS 200 designates this troubleshooting problem identified in the APAR as a candidate for provisioning, as per respective blocks 417, 422, 427 and 432 and process flow continues to decision block 445 of FIG. 4B. The file system tool 283" searches nonvolatile storage 245 in provisioning IHS 200 for an existing virtual machine image of an appropriate virtual machine for the problem data (for example, VM 291 or VM 292 or other virtual machine images not specifically identified), as per decision block 445. If an appropriate matching virtual machine image does exist (as for example VM 291) for the particular problem type in the APAR, then the file system tool 283" provisions the image as virtual machine 291 of hypervisor 295, as per block 450. Operation then terminates with end block 495.

If an appropriate matching virtual machine image does not exist as per block 445, the file system tool 283 finds the closest matching virtual machine image from the virtual machines in database 284 of nonvolatile storage 245, as per block 455. The file system tool 283" next attempts to automatically apply missing maintenance information and configuration information to the closest matching virtual machine image, as per block 460. Maintenance information and configuration information can be applied automatically if the maintenance is packaged in such a format that the maintenance information can be applied using some form of "silent install". Silent install refers to maintenance information that can be installed via a parameterized script or by a patch management tool such as IBM Tivoli Endpoint Manager without requiring input from a user during the installation procedure.

If the file system tool 283" at decision block 460 determines to apply missing maintenance information and configuration information automatically, then file system tool 283" provisions the closest matching virtual image and applies missing maintenance information and configuration information automatically, as per block 480. As part of provisioning the virtual image with maintenance information and configuration applied thereto, the provisioned virtual image thus formed is deployed locally in the system memory 220 of provisioning IHS 200. Deploying the provisioned virtually image locally in provisioning IHS 200 enables troubleshooting of the client IHS 300 locally in the provisioning IHS 200.

However, if the file system tool 283" at decision block 460 determines to not apply missing maintenance information and configuration information automatically, then file system tool 283", then the file system tool 283" provisions the closest matching image, and system operators may apply the missing maintenance information and configuration information manually, as per block 465. The file system tool 283" checks whether it is worthwhile to create a new baseline image template based on the newly provisioned image, as per block 485. Making this determination involves leveraging a policy-based approach that leverages configurable policies. For example, this determination involves checking thresholds such as how long it took to apply maintenance information and configuration information and determining if based on thresholds it is worthwhile to create a new baseline image. If creating a new baseline image is not worthwhile, then operation terminates at end block 495. If creating a new baseline image is worthwhile, then the file system tool 283" requests to create a new baseline image as per block 490. Operation terminates with end block 495.

In one embodiment, file system tool 283" determines if it is worthwhile to create the new baseline image via a policy-based approach that leverages configurable policies taking into account the following policy factors of TABLE 1. Applying the policies of TABLE 1 may leverage proactive provisioning of virtual environments without dramatically over provisioning resources. This approach may reduce the amount of time and overhead needed to setup an appropriate virtual machine environment for client problem recreation for troubleshooting sessions. Applying the policies may also optimize the process for determining when it is appropriate to create new virtual image templates that further reduces the overhead of leveraging virtual images for troubleshooting.

In one embodiment, the disclosed methodology provides a policy-based selection process for provisioning the most appropriate virtual environment based upon problem determination data and historical problem type analysis. This approach enables troubleshooting by the provisioning IHS of problems that a client IHS experiences as recorded in the APAR that the provisioning IHS receives from the client IHS. In one embodiment, the disclosures herein teach how to provision virtual environments locally in the provisioning IHS only when beneficial for troubleshooting and problem recreation. Moreover, the disclosed methodology leverages policy and historical data to improve the cost-effectiveness for recreating customer problems locally in the provisioning IHS for troubleshooting by the provisioning IHS. The disclosed methodology is also useful for optimizing the process for determining when it is appropriate to create new virtual image templates which further reduces the overhead of leveraging virtual images for troubleshooting. In one embodiment, when the provisioning IHS receives the APAR, the disclosed methodology uses policies to determine if the problem in the APAR is a candidate for automatically provisioning a virtual environment for problem recreation locally in the provisioning IHS. If the provisioning IHS determines that under these policies the problem is a candidate for automatic provisioning, then the disclosed methodology either finds an appropriate virtual image in the virtual image database or creates an appropriate virtual image with necessary maintenance information applied thereto and appropriately configured. If the provisioning IHS determine that under these policies it is worthwhile to create a new baseline image template, then the disclosed methodology creates such a new baseline image template that is available for future use in troubleshooting.

As will be appreciated by one skilled in the art, aspects of the disclosed methodology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the FIG. 4A and FIG. 4B flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts of FIGS. 4A and 4B and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowcharts of FIG. 4A and FIG. 4B described above.

The flowcharts of FIG. 4A and FIG. 4B illustrate the architecture, functionality, and operation of possible implementations of systems, methods and computer program products that perform network analysis in accordance with various embodiments of the present invention. In this regard, each block in the flowcharts of FIG. 4A and FIG. 4B may represent a module, segment, or portion of code, which comprises one or more executable instructions for implementing the specified logical function(s). It should also be noted that, in some alternative implementations, the functions noted in the block may occur out of the order noted in FIG. 4A and FIG. 4B. For example, two blocks shown in succession may, in fact, be executed substantially concurrently, or the blocks may sometimes be executed in the reverse order, depending upon the functionality involved. It will also be noted that each block of FIG. 4A and FIG. 4B and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, blocks, operations, elements, and/or components, but do not preclude the presence or addition of one or more other features, integers, steps, blocks, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. For example, those skilled in the art will appreciate that the logic sense (logic high (1), logic low (0)) of the apparatus and methods described herein may be reversed and still achieve equivalent results. The embodiment was chosen and described in order to best explain the principles of the invention and the practical application, and to enable others of ordinary skill in the art to understand the invention for various embodiments with various modifications as are suited to the particular use contemplated.

We claim:

1. A provisioning information handling system (IHS), comprising:
   a processor;
   a memory, coupled to the processor, the memory including a file system tool that is configured to:

receive a problem report via automated data collection that describes a problem in a client IHS, wherein the problem report comprises an authorized program analysis report (APAR);

determine without manual intervention if the problem is a candidate for provisioning locally in the provisioning IHS for the purpose of troubleshooting the problem in the client IHS;

access a virtual machine image database that includes a plurality of virtual machine images to determine if a particular virtual machine image therein is a match for the problem in the problem report of the client IHS and in the event of such a match provisioning the particular virtual machine image to a memory of the provisioning IHS after applying maintenance information and configuration information to the particular virtual machine image, wherein in the event of no match between a virtual machine image of the virtual machine image database and the problem in the problem report, the provisioning IHS determines if a particular virtual machine image in the virtual machine image database that most closely matches the problem in the problem report, thus providing a closest match virtual machine image, wherein the provisioning IHS provisions the closest match virtual machine image to the memory of the provisioning IHS after application of maintenance information and configuration information to the particular virtual machine image; and test the particular virtual machine image provisioned in the provisioning IHS to troubleshoot the problem in the client IHS.

2. The provisioning IHS of claim 1, wherein the problem report includes problem type information, customer information, system environment information, configuration information and program version of the client IHS.

3. The provisioning IHS of claim 1, wherein the provisioning IHS considers policies to determine without manual intervention if the problem is a candidate for provisioning locally in the provisioning IHS for troubleshooting purposes.

4. The provisioning IHS of claim 1, wherein the provisioning IHS determines if it is worthwhile to create a new baseline image template for the particular virtual machine that was provisioned by considering predetermined policies.

5. The provisioning IHS of claim 4, wherein the predetermined policies relate to the time required to install maintenance information on a provisioned virtual image, the number of maintenance fixes on the provisioned virtual image and the time required to apply configuration information to the provisioned virtual image.

6. A computer program product, comprising:
a non-transitory computer readable storage medium having computer usable program code embodied therewith for use in a provisioning information handling system (IHS), the computer usable program code comprising:
first instructions that receive a problem report via automated data collection that describes a problem in a client IHS, wherein the problem report comprises an authorized program analysis report (APAR);
second instructions that determine without manual intervention if the problem is a candidate for provisioning locally in the provisioning IHS for the purpose of troubleshooting the problem in the client IHS;
third instructions that access a virtual machine image database that includes a plurality of virtual machine images to determine if a particular virtual machine image therein is a match for the problem in the problem report of the client IHS and in the event of such a match provisioning the particular virtual machine image to a memory of the provisioning IHS after applying maintenance information and configuration information to the particular virtual machine image, and fourth instructions that test the particular virtual machine image provisioned in the provisioning IHS to troubleshoot the problem in the client IHS;

wherein in the event that the third instructions find no match between a virtual machine image of the virtual machine image database and the problem in the problem report, the computer program product includes fifth instructions that instruct the provisioning IHS to determine if a particular virtual machine image in the virtual machine image database that most closely matches the problem in the problem report, thus providing a closest match virtual machine image, wherein the provisioning IHS provisions the closest match virtual machine image to the memory of the provisioning IHS after application of maintenance information and configuration information to the particular virtual machine image;

wherein the first, second, third and fourth instructions are stored on the non-transitory computer readable storage medium.

7. The computer program product of claim 6, wherein the problem report includes problem type information, customer information, system environment information, configuration information and program version of the client IHS.

8. The computer program product of claim 6, wherein the second instructions instruct the provisioning IHS to consider policies to determine without manual intervention if the problem is a candidate for provisioning locally in the provisioning IHS for troubleshooting purposes.

9. The computer program product of claim 6, further comprising: sixth instructions that instruct the provisioning IHS to determine if it is worthwhile to create a new baseline image template for the particular virtual machine that was provisioned by considering predetermined policies.

10. A provisioning information handling system (IHS), comprising:
a processor;
a memory, coupled to the processor, the memory including a file system tool that is configured to:
receive a problem report that describes a problem in a client IHS;
determine without manual intervention if the problem is a candidate for provisioning locally in the provisioning IHS for the purpose of troubleshooting the problem in the client IHS;
access a virtual machine image database that includes a plurality of virtual machine images to determine if a particular virtual machine image therein is a match for the problem in the problem report of the client IHS and in the event of such a match provisioning the particular virtual machine image to a memory of the provisioning IHS after application of maintenance information and configuration information to the particular virtual machine image, wherein the provisioning IHS determines if it is worthwhile to create a new baseline image template for the particular virtual machine that was provisioned by considering predetermined policies, wherein the predetermined policies relate to the time required to install maintenance information on a provisioned virtual image, the number of maintenance fixes on the provisioned virtual image and the time required to apply configuration
information to the provisioned virtual image; and test the particular virtual machine image provisioned in
the provisioning IHS to troubleshoot the problem in
the client IHS.

* * * * *